Oct. 5, 1937.   J. H. DORAN   2,095,128
FABRICATED ELASTIC FLUID TURBINE CASING
Filed Jan. 2, 1936

Inventor:
John H. Doran,
by Harry E. Dunham
His Attorney.

Patented Oct. 5, 1937

2,095,128

UNITED STATES PATENT OFFICE 2,095,128

FABRICATED ELASTIC FLUID TURBINE CASING

John H. Doran, Schenectady, N. Y., assignor to General Electric Company, a corporation of New York Application January 2, 1936, Serial No. 57,082

2 Claims. (Cl. 253—1)

The present invention relates to fabricated casings for elastic fluid turbines and like machines having two or more flanged parts bolted together. Such flanged parts are often subjected to high stresses, especially in the case of modern, high pressure, high temperature elastic fluid turbines.

The object of my invention is to provide an improved construction and arrangement of fabricated flanged casing structures whereby the danger due to high stresses set up in the flanged portions is materially reduced. This is accomplished in accordance with my invention by the provision of a flanged casing structure in which the flange is formed by an angle iron having one leg defining the flange and another leg welded edgewise to a wall portion of the casing with the surfaces of the other leg forming smooth continuations of the surfaces of said wall portion.

For a consideration of what I consider to be novel and my invention, attention is directed to the following description and the claims appended thereto in connection with the accompanying drawing.

Figure 1:
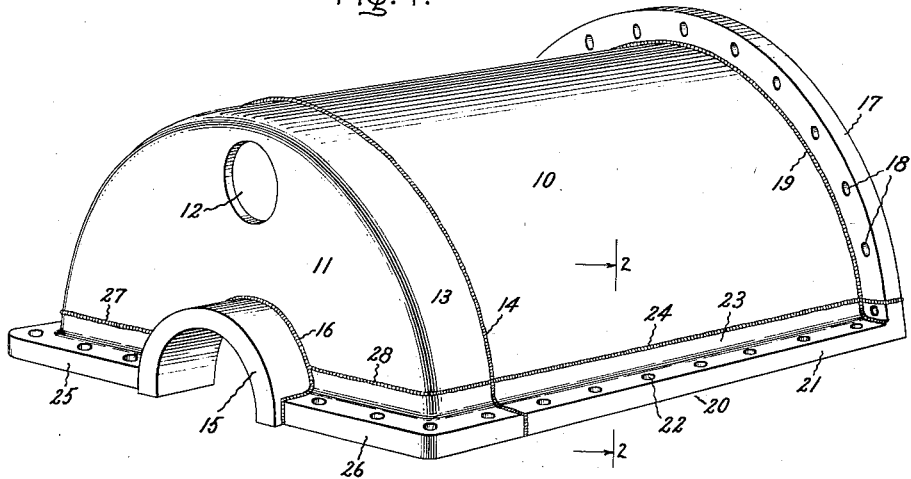
Figure 2:
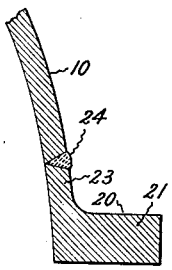

In the drawing, Fig. 1 represents a perspective view of a high pressure, high temperature elastic fluid turbine casing embodying my invention, and Fig. 2 is a sectional view along line 2—2 of Fig. 1.

The arrangement illustrated is the upper half of a turbine casing comprising an outer wall 10 which in the present instance is cylindrically-shaped and may be formed by a rolled steel plate. The casing has an inlet or end wall 11 with an opening 12 through which elastic fluid is conducted to the turbine. The wall 11 is initially formed integral with a cylindrical edge portion 13 and united with the outer wall 10 by a weld 14. A cylindrical element 15 for accommodating bearing and packing means between the casing and a shaft, not shown, is secured to the end wall 11 by a weld 16. The rear or outlet end of the outer casing which is to be connected to a condenser is provided with a flange 17 which in the present instance is in the form of a ring having a plurality of bolt holes 18 and united with the outer surface of the wall 10 by a weld 19.

The lower portion of the upper casing half, shown in the drawing, which is to be connected to a lower half, not shown, is provided with flanges. These flanges in accordance with my invention are formed by angle irons. Each angle iron has one leg defining a flange and another leg welded edgewise to a portion of the casing wall. In the present instance I have shown an angle iron 20 which has a leg 21 provided with bolt holes 22 and another leg 23 secured edgewise to the lower edge of the outer wall 10 by a weld 24. As indicated in Fig. 2, the thickness of the leg 23 is preferably the same as that of the outer wall 10, and the outer and inner surfaces of the leg 23 are curved to form smooth continuations of the corresponding surfaces of the outer wall 10. The leg 21 defining the flange is heavier than the leg 23, the thickness of the leg 21 depending upon pressures and temperatures to which the casing is to be subjected. The inlet portion of the casing is provided with flanges 25 and 26 which, similar to the flange 20, are defined by angle irons having one leg defining the flanges and another leg defining portions of the end wall and secured edgewise to other portions of the end wall by welds 27 and 28. Thus, with my invention the welded seams are removed from the flanges. This reduces the danger of breakage due to excessive strains and stresses set up in the flanged portions during operation. The strains and stresses set up in the welded seams in my improved casing structure are more uniformly distributed. This in turn reduces the danger of leakage through the flanged casing portions which is especially significant in connection with elastic fluid turbines using an operating medium other than steam, such as mercury vapor.

What I claim as new and desire to secure by Letters Patent of the United States, is:

1. An elastic fluid turbine casing subject to high temperature and pressure having two fabricated flanged casing halves, each half comprising a wall member and an angle iron having one leg defining a flange with bolt holes and another leg welded edgewise to the wall member and having inner and outer surfaces forming smooth continuations of the inner and outer surfaces of the wall member.

2. A fabricated elastic fluid turbine casing subject to high temperatures and pressures having two flanged parts, each part comprising a wall portion and an angle, the angle having a first leg projecting laterally away from the machine casing to define a flange and a second leg united edgewise by fused metal with said wall portion to define another wall portion of the casing.

JOHN H. DORAN.